US009524565B2

(12) United States Patent
Zhu et al.

(10) Patent No.: US 9,524,565 B2
(45) Date of Patent: Dec. 20, 2016

(54) METHOD OF FREEFORM IMAGING SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 251 days.

(21) Appl. No.: 14/316,740

(22) Filed: Jun. 26, 2014

(65) Prior Publication Data

US 2015/0130806 A1 May 14, 2015

(30) Foreign Application Priority Data

Oct. 24, 2013 (CN) .......................... 2013 1 0504183

(51) Int. Cl.
*G06T 7/60* (2006.01)
*G02B 27/00* (2006.01)

(52) U.S. Cl.
CPC .......... *G06T 7/604* (2013.01); *G02B 27/0012* (2013.01)

(58) Field of Classification Search
None
See application file for complete search history.

(56) References Cited

U.S. PATENT DOCUMENTS

| | | | |
|---|---|---|---|
| 2007/0219760 A1* | 9/2007 | Yang ...................... | G06F 17/50 703/1 |
| 2015/0130806 A1* | 5/2015 | Yang ...................... | G06T 7/604 345/426 |
| 2016/0091723 A1* | 3/2016 | Rolland ............. | G02B 17/0816 359/633 |

OTHER PUBLICATIONS

"Computer-aided design and optimization of free-form reflectors", by Bo Yang and Yongtian Wang, Proceedings of SPIE, vol. 5638, pp. 88-96, Apr. 2005.*

(Continued)

*Primary Examiner* — James A Thompson
(74) *Attorney, Agent, or Firm* — Zhigang Ma

(57) ABSTRACT

A design method of freeform imaging system is provided. An initial freeform imaging system is provided, the initial freeform image system comprising a first initial surface and a second initial surface spaced from each other. A second surface is constructed by calculating a plurality of second data points of the second surface through a plurality of feature rays based on the given object-image relationship. A first surface is constructed by calculating a plurality of first data points of the first surface based on the given object-image relationship and Fermat's principle, wherein the second surface is fixed. The first surface and the second surface substitute for the first initial surface and second initial surface respectively, and repeating steps list above, wherein the plurality of feature rays are intersecting the image plane at the plurality of ideal image points.

20 Claims, 11 Drawing Sheets

(56) References Cited

OTHER PUBLICATIONS

"Freeform surface lens for LED uniform illumination", by Zheng Zhenrong, Hao Xiang, and Liu Xu, Applied Optics, vol. 48, No. 35, pp. 6627-6634, Dec. 10, 2009.*

"Direct design of freeform surfaces and freeform imaging systems with a point-by-point three-dimensional construction-iteration method", by Tong Yang, Jun Zhu, Xiaofei Wu, and Guofan Jin, Optics Express, vol. 23, No. 8, pp. 10233-10246, Apr. 2015.*

"Freeform Optical Surfaces: A Revolution in Imaging Optical Design", by Kevin P Thompson and Jannick P Rolland, OPN Optics & Photonics News, pp. 30-35, Jun. 2012.*

* cited by examiner

METHOD OF FREEFORM IMAGING SYSTEM

CROSS-REFERENCE TO RELATED APPLICATIONS

This application claims all benefits accruing under 35 U.S.C. §119 from China Patent Application No. 201310504183.6, field on Oct. 24, 2013 in the China Intellectual Property Office, disclosure of which is incorporated herein by reference.

BACKGROUND

1. Technical Field

The present disclosure relates to a design method of a freeform imaging system, especially a freeform imaging system with wide linear field-of-view (FOV).

2. Description of Related Art

Compared with conventional rotationally symmetric surfaces, freeform optical surfaces have higher degrees of freedom, which can reduce the aberrations and simplify the structure of the system in optical design. In recent years, with the development of the advancing manufacture technologies, freeform surfaces have been successfully used in the imaging field, such as head-mounted-displays, reflective systems, varifocal panoramic optical systems, and microlens arrays.

Traditional freeform imaging system design uses spherical or aspherical system as the starting point. Then, some surfaces in the system are replaced by freeform surfaces to obtain satisfactory results.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the design method of the freeform imaging system.

Figure 1:
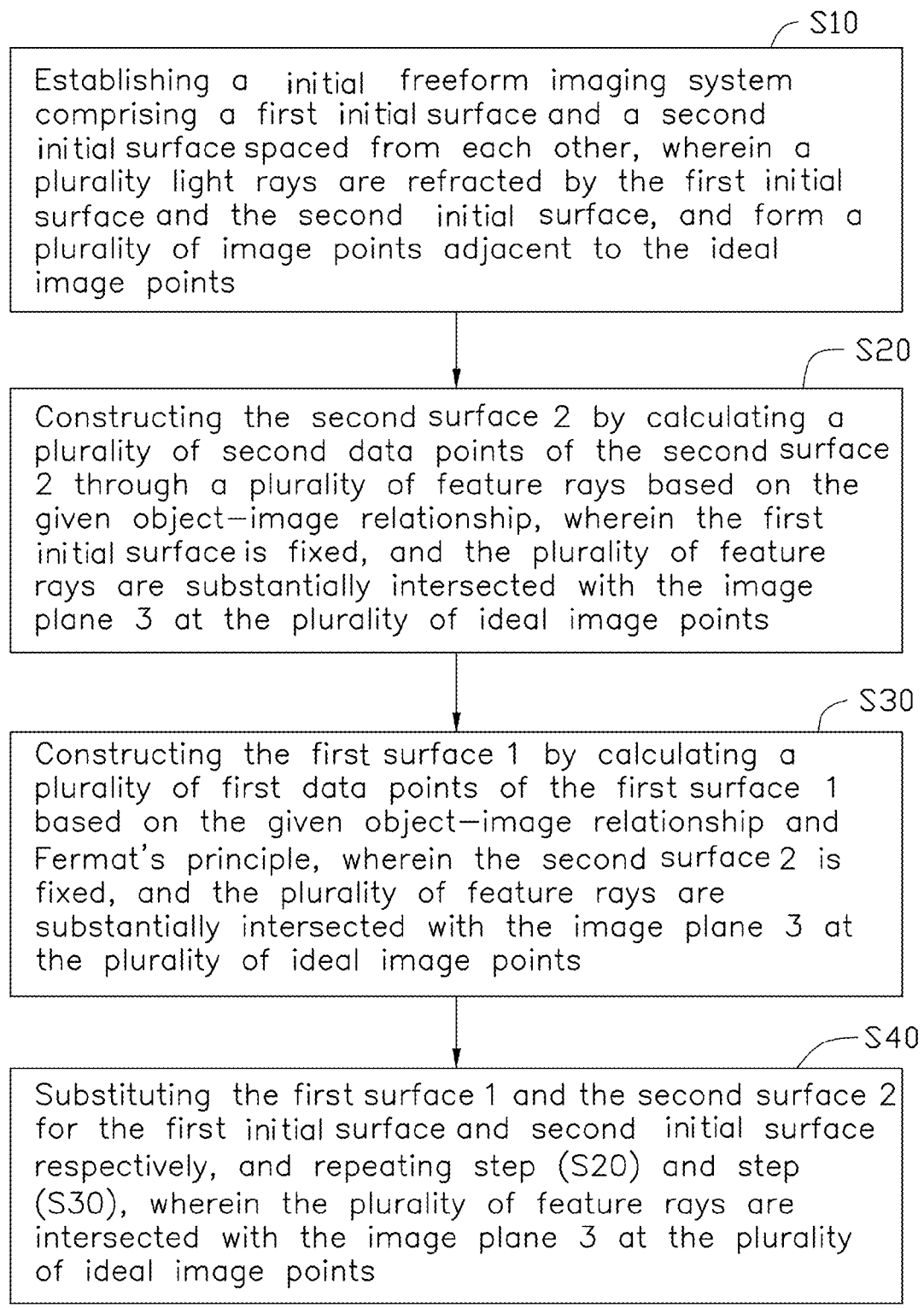
FIG. 1 shows a flow chart of one embodiment of a design method of a freeform imaging system.
Figure 2:
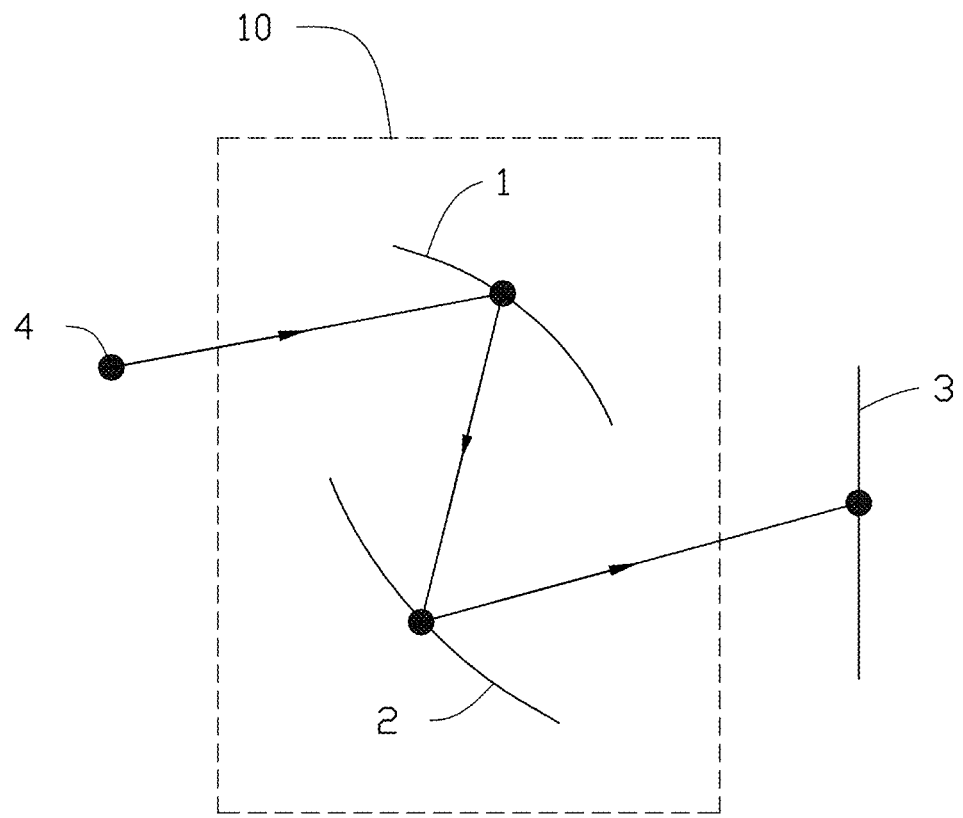
FIG. 2 is a schematic view of the freeform imaging system.

Referring to FIGS. 1 and 2, a given freeform imaging system 10 is located between an object 4 and an image plane 3. The freeform imaging system 10 comprises a first surface 1 and a second surface 2 spaced from the first surface 1. The first surface 1 faces the entrance pupil 10, and the second surface 2 faces the image plane 3. Light rays from the object 4 will be redirected or reflected by the first surface 1 and the second surface 2 in that sequence, and focus on the image plane 3 to form a plurality of ideal image points. The freeform imaging system is constructed with a construction-iteration method based on a given object-image relationship.

A design method of freeform imaging system 10 comprises the following steps:

step (S10), establishing a initial freeform imaging system comprising a first initial surface and a second initial surface spaced from each other, wherein a plurality of light rays are redirected by the first initial surface and the second initial surface, and form a plurality of image points adjacent to the ideal image points;

step (S20), constructing the second surface 2 by calculating a plurality of second data points of the second surface 2 through a plurality of feature rays based on the given object-image relationship, wherein the first initial surface is fixed, and the plurality of feature rays are substantially intersected with the image plane 3 at the plurality of ideal image points in the ideal case;

step (S30), constructing the first surface 1 by calculating a plurality of first data points of the first surface 1 based on the given object-image relationship and Fermat's principle, wherein the second surface 2 is fixed, and the plurality of feature rays are substantially intersected with the image plane 3 at the plurality of ideal image points in the ideal case; and step (S40), substituting the first surface 1 and the second surface 2 for the first initial surface and the second initial surface respectively, and repeating step (S20) and step (S30), wherein the plurality of feature rays are intersected with the image plane 3 at the plurality of ideal image points.

In step (S10), the first initial surface and the second initial surface can be planar, curved, or spherical. A coordinate system is established in the initial freeform imaging system model. The coordinate origin O is located at the center of the object 4. In one embodiment, the object 4 is an entrance pupil, and the coordinate origin is located at the center of the entrance pupil. A z-axis is defined as the direction substantially perpendicular with the image plane 3 and passing through the center of the entrance pupil. The x-axis and y-axis are substantially perpendicular with each other and substantially perpendicular with the z-axis.

In step (S20), a plurality of one-dimensional sampling fields of the first initial surface are defined in the YOZ coordinate surface.

In one embodiment, the FOV 2ω (±ω, symmetrically distributed on the two sides of z-axis) of the initial freeform imaging system is divided into M sampling fields with equal interval. Each of the M sampling fields is divided by N feature rays, and the N feature rays comprise marginal rays of the entrance pupil. Thus a diameter of the entrance pupil is divided into N−1 portions in each of the M sampling fields. Therefore, a total of K=M×N feature rays have been selected according to different sampling fields.

Figure 3:
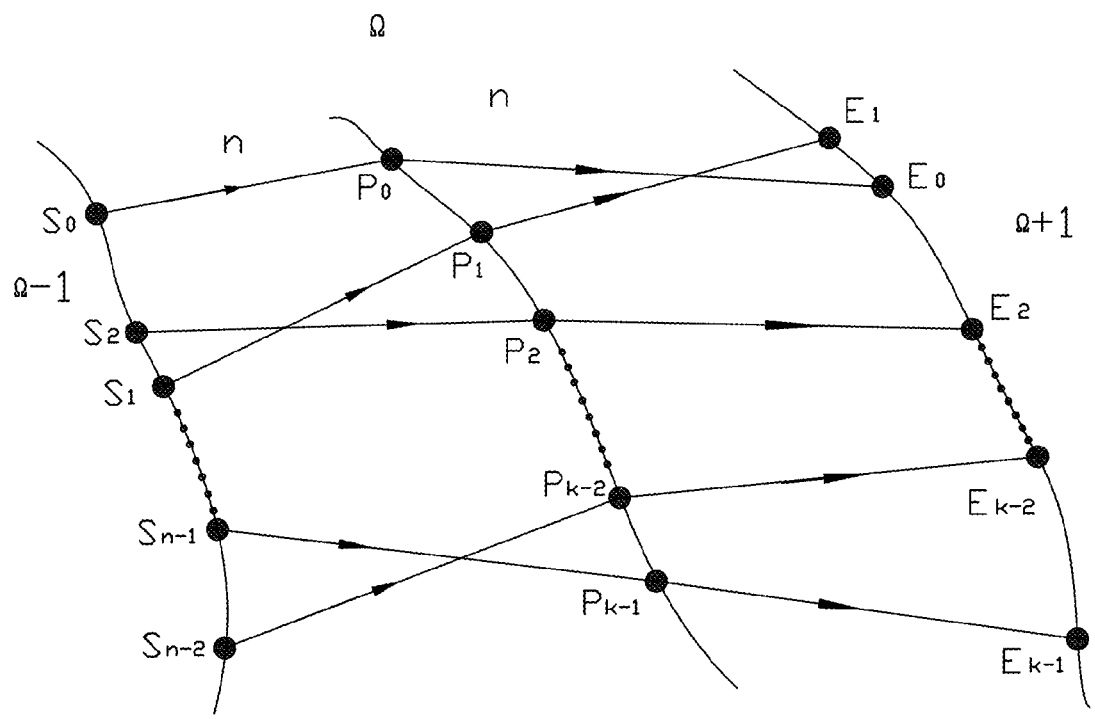
FIG. 3 is a schematic view of a plurality of feature rays intersected with a surface $\Omega-1$, a surface $\Omega$, and a surface $\Omega+1$ in that sequence, wherein $S_i$ (i=0,1,2 ... K-1) is defined as start points, $E_i$ (i=0,1,2 ... K-1) is defined as end points of the plurality of feature rays; $P_i$(i=0,1,2 ... K-1) are defined as a plurality of data points on surface $\Omega$.

Further referring to FIG. 3, the second surface 2 is constructed as surface Ω with the plurality of data points $P_i$(i=0, 1, 2 . . . K−1), the first surface 1 is taken as surface Ω−1, and the image plane 3 is taken as surface Ω+1. The plurality of feature rays are intersected with the surface Ω−1 at a plurality of start points $S_i$ (i=0, 1, 2 . . . K−1), and intersected with the surface Ω+1 at a plurality of end points $E_i$ (i=0, 1, 2 . . . K−1). The plurality of end points $E_i$ (i=0, 1, 2 . . . K−1) can be generally obtained based on the Fermat's principle. Because the second surface 2 is adjacent to the image surface 3, the plurality of end points $E_i$ (i=0, 1, 2 . . . K−1) of the plurality of feature rays are the plurality of ideal image points and can be calculated based on the given object-image relationship.

A unit normal vector $\vec{N}_i$ at each of the plurality of second data point $P_i$ can be calculated based on the vector form of Snell's Law. For a refractive second surface 2, $$\vec{N}_i = \frac{n'\vec{r}'_i - n\vec{r}_i}{|n'\vec{r}'_i - n\vec{r}_i|} \quad (1)$$

where $$\vec{r}_i = \frac{\overrightarrow{P_i S_i}}{|\overrightarrow{P_i S_i}|}, \vec{r}'_i = \frac{\overrightarrow{E_i P_i}}{|\overrightarrow{E_i P_i}|}$$

are the unit vectors along the directions of the incident and exit ray at two opposite sides of the second surface 2 respectively. n, n' are the refractive indices of the two media at two opposite sides of the second surface 2.

Similarly, for a reflective second surface 2, $$\vec{N}_i = \frac{\vec{r}'_i - \vec{r}_i}{|\vec{r}'_i - \vec{r}_i|}. \quad (2)$$

Figure 4:
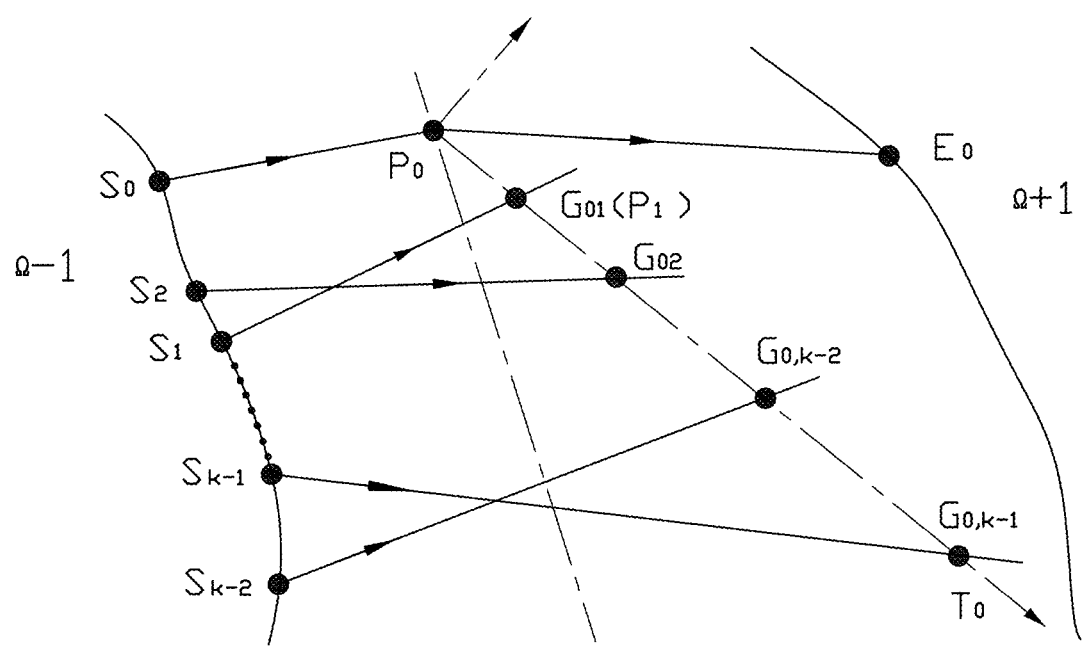
FIG. 4 shows a schematic view of one embodiment of calculating adjacent data points.
Figure 5:
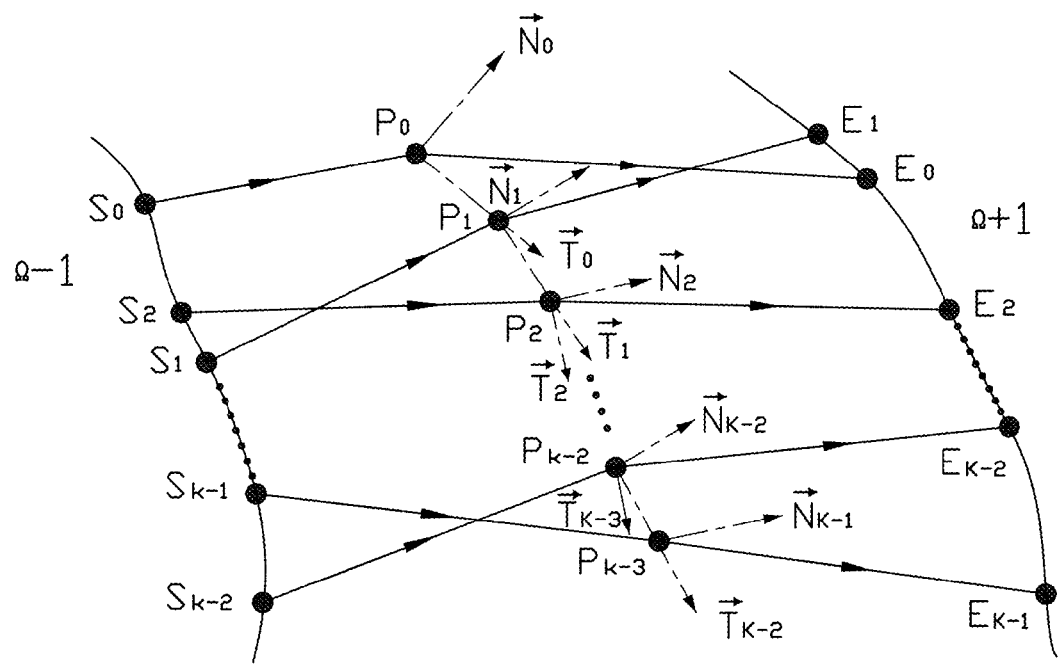
FIG. 5 shows a schematic view of one embodiment of a construction approach of the surface $\Omega-1$, $\Omega$, and $\Omega+1$; wherein $P_i$(i=0,1 ... K-1) are the data points on the surface $\Omega$. $\vec{N}_i$ and $\vec{T}_i$ T(i=0,1 ... K-1) are the surface normal vector and tangential vector at each data point respectively.

Referring to FIGS. 4 and 5, the step of calculating the plurality of second data points $P_i$ of the second surface 2 comprises the following substeps:

step (S21), fixing an initial second data point $P_0$, wherein the initial second data point $P_0$ is the interaction between a first feature ray and the second initial surface, wherein the first feature ray is the marginal feature ray from the margin of the entrance pupil;

step (S22), obtaining a second feature ray from the K−1 feature rays, wherein the second feature ray is intersected with the second initial surface at the second data point $P_1$ adjacent to the initial second data point $P_0$;

step (S23), calculating a surface normal $\vec{N}_1$ at the second data point $P_1$ based on a start point $S_1$ an end point $E_1$ of the second feature ray;

step (S24), obtaining the second data point $P_2$ which is nearest to the second data point $P_1$ among the rest of K−2 intersections of the tangent vector $\vec{T}_1$ at the second data point $P_1$ and the remaining K−2 feature rays; and step (S25), repeating steps (S22) to steps (S24) until all of the $P_i$ (i=0, 1, 2 . . . K−1) are obtained.

In step (S21), the initial second data point $P_0$ is the intersection of the first feature ray from the margin of the entrance pupil and the initial second surface, thus the start point $S_0$ and end point $E_0$ of the first feature ray can be obtained. The surface normal $\vec{N}_0$ at the initial second data point $P_0$ can be calculated by Eq. (1) or Eq. (2), and then the tangent vector $\vec{T}_0$ at the second data point $P_0$ can be obtained.

In step (S22), to find the next second data point $P_1$ on the second surface 1, the associated second feature ray among the remaining K−1 feature rays corresponding to different fields and different pupil coordinates need to be determined. "Nearest-ray Principle" is one of the methods. The Nearest-ray Principle states that the feature ray nearest to $P_i$ is taken as the feature ray to obtain the next data point $P_{i+1}$ in the construction process.

According to the Nearest-ray Principle, the second data point $P_1$ is obtained by finding the second data point nearest to the second data point $P_0$ among the K−1 intersections $G_{0i}$ (i=1,2 . . . K−1) where the tangent vector $\vec{T}_0$ intersects with the remaining K−1 feature rays from the first surface 1. Thus the feature ray of the K−1 feature rays passing the second data point $P_1$ is defined as the second feature ray.

In step (S24), the second data point $P_2$ is defined as nearest to the second data point $P_1$ among the rest of K−2 intersections of the tangent vector $\vec{T}_1$ at the second data point $P_1$ and the remaining K−2 feature rays.

In step (S25), after all of the second data points $P_i$ are obtained, the second surface 2 can be obtained by curve fitting all of the second data points $P_i$.

Figure 6:
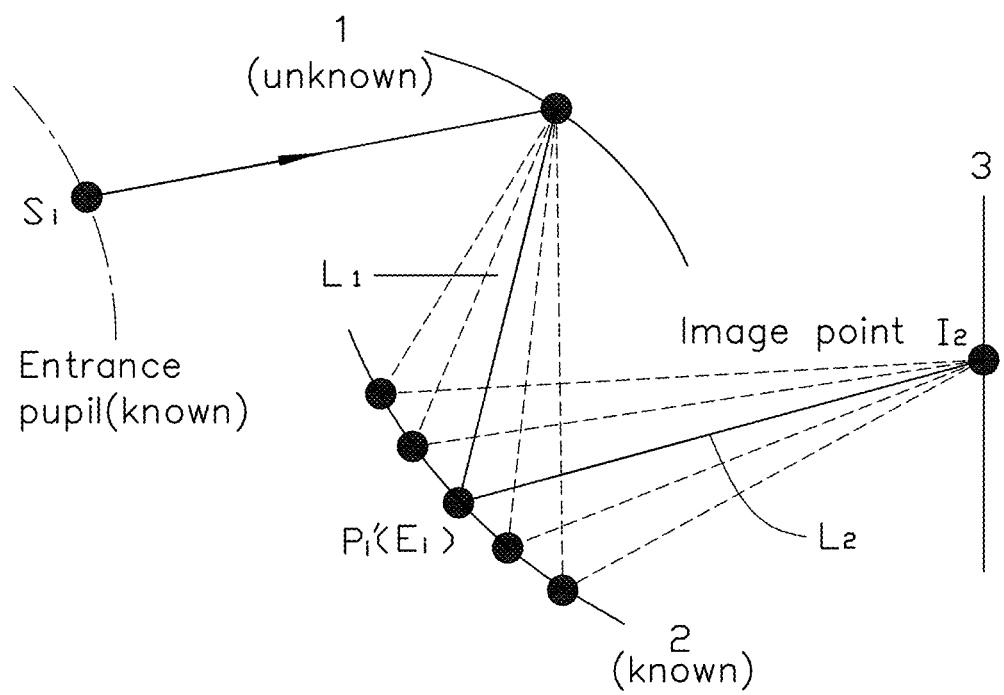
FIG. 6 shows a schematic view of one embodiment of determining the plurality of end points.

In step (S30), further referring to FIG. 6, the first surface 1 can be obtained with the similar method. The plurality of feature rays are redirected to their ideal image points $I_2$ on the image plane 3 with the first surface 1, and the second surface 2 is fixed.

A feature ray comes from a start point $S_i$ on entrance pupil. An incident ray $\overrightarrow{S_i P_i}$ is redirected into $\overrightarrow{P_i P'_i}$ by the first surface 1, and is then redirected to its ideal image point $I_i$ by the second surface 2. So $P_i'$ stands for the end point $E_i$ of the feature ray when calculating the first data points on the first surface 1. Fermat's principle is used to calculate the coordinate of $P_i'$. The Fermat's principle states that the optical path length between two fixed points is an extreme (generally a minimum). According to Fermat's principle, $P_i'$ is the point on the second surface 2 which minimizes the optical path length between $P_i$-$P_i'$-$I_i$. The optical path length L of $P_i$-$P_i'$-$I_i$ can be expressed as:

$$L = n_{1-2}L_1 + n_{2-image}L_2 = n_{1-2}\overline{P_i P'_i} + n_{2-image}\overline{P'_i I_i} \quad (3)$$

wherein $n_{1-2}$ is the refractive indices of the medium between the first surface 1 and the second surface 2, and $n_{2-image}$ is the medium between the second surface 2 and the image plane 3.

Thus $P_i'$ can be obtained by minimizing L. With $S_i$, $P_i$ and $P_i'$, the surface normal $\vec{N}_i$ at each first data point can be obtained using Eq. (1) or Eq. (2), and all the first data points on the first surface 1 can be calculated. The first surface 1 is finally obtained by curve fitting all of the plurality of first data points.

Figure 7:
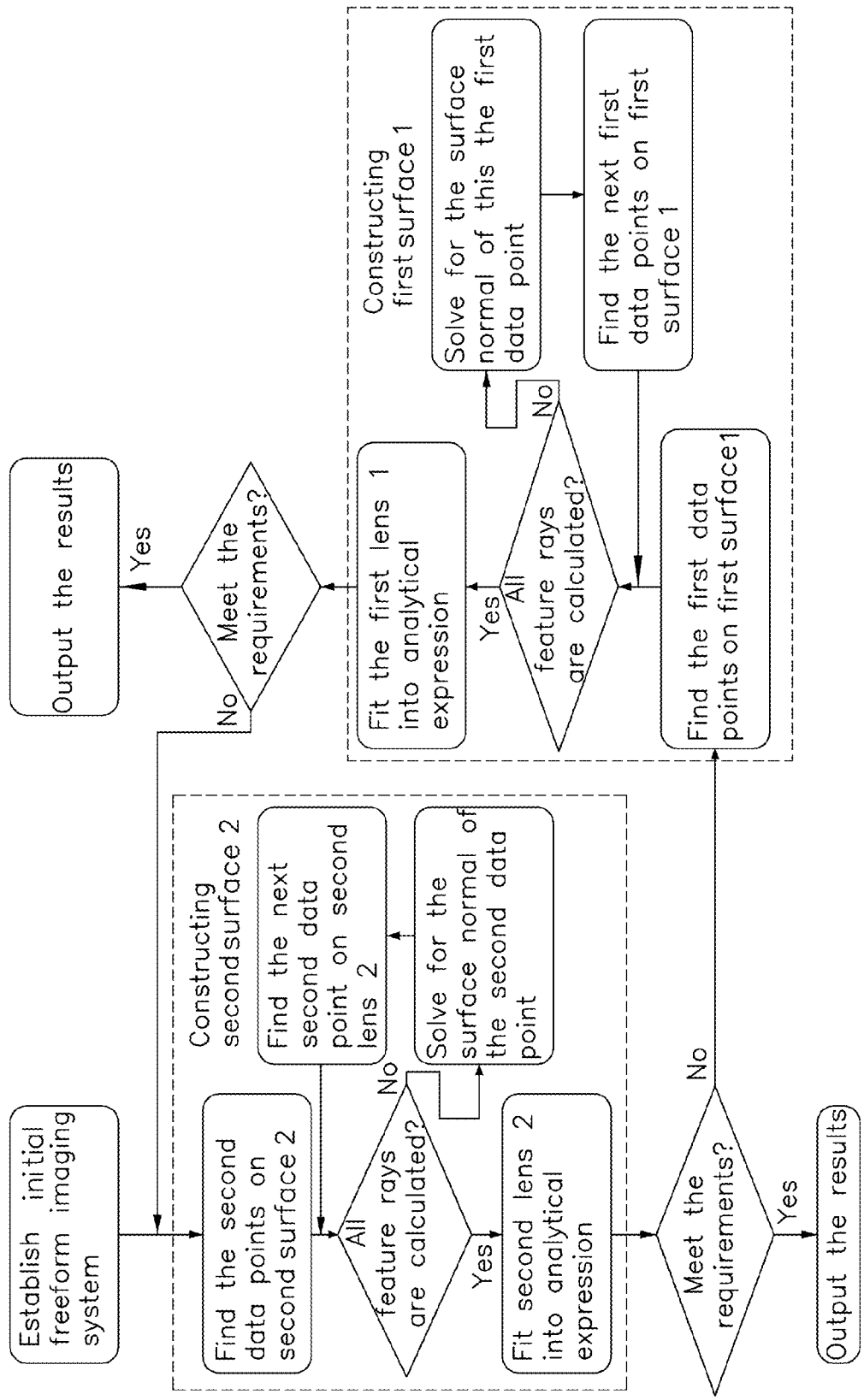
FIG. 7 shows a flow chart of one embodiment of a design method of a freeform imaging system.

In step (S40), further referring to FIG. 7, to further improve the image quality, the first surface 1 and the second surface 2 can be further taken as new initial surfaces. The first surface 1 substitutes the initial first surface, and the second surface 2 substitutes the initial second surface. Thus the new first surface and the new second surface can be constructed using the same method. By repeating the above process, the image quality will be gradually improved. After several iterations, the plurality of feature rays can be redirected approximately to their ideal image points and a satisfactory design result obtained.

Embodiment

To validate the above design method, a freeform off-axis two-mirror imaging system for linearly scanning was designed with the CI method. The parameters of the scanning system are given in Table 1.

TABLE 1

Parameters of the freeform scanning system.

| Parameter | Specification |
|---|---|
| FOV | 8° |
| Scanning range | 40 mm |
| Diameter of the entrance pupil | 6 mm |
| Number of surface | 2 reflective freeform surface |
| Object-image relationships | Scan width y(mm) = −80 + 5θ (θ: deg) (In the global coordinates whose origin locates at the center of the entrance pupil |
| The distance between the entrance pupil and the image plane | 180 mm |

Figure 8:
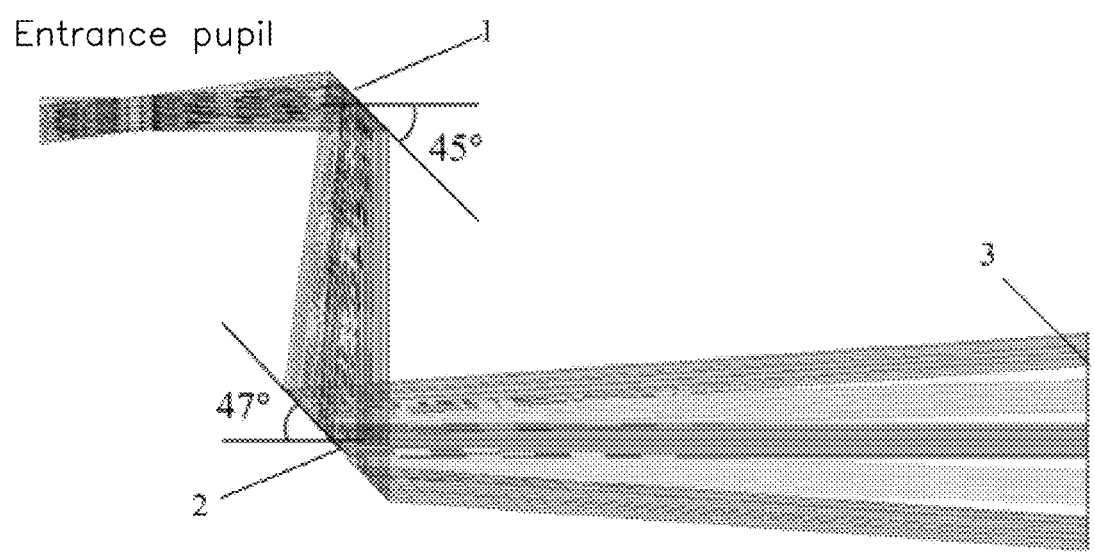
FIG. 8 shows a schematic view of one embodiment of initial freeform imaging system in the design method of FIG. 1.

Referring to FIG. 8, the initial system was set up with two planes. The two planes have a 45° and 47° tilt about the z-axis in the global coordinates respectively. The distance between the entrance pupil (or the object) and the first surface, between the first surface and the second surface, and between the second surface and the image plane are 45 mm, 70 mm, and 135 mm, respectively. During the design process, five sampling fields in the system are sampled and three different pupil coordinates of each sampling field were employed. To analyze the effect of the iterative process, the iteration is conducted 12 times.

Figure 9:
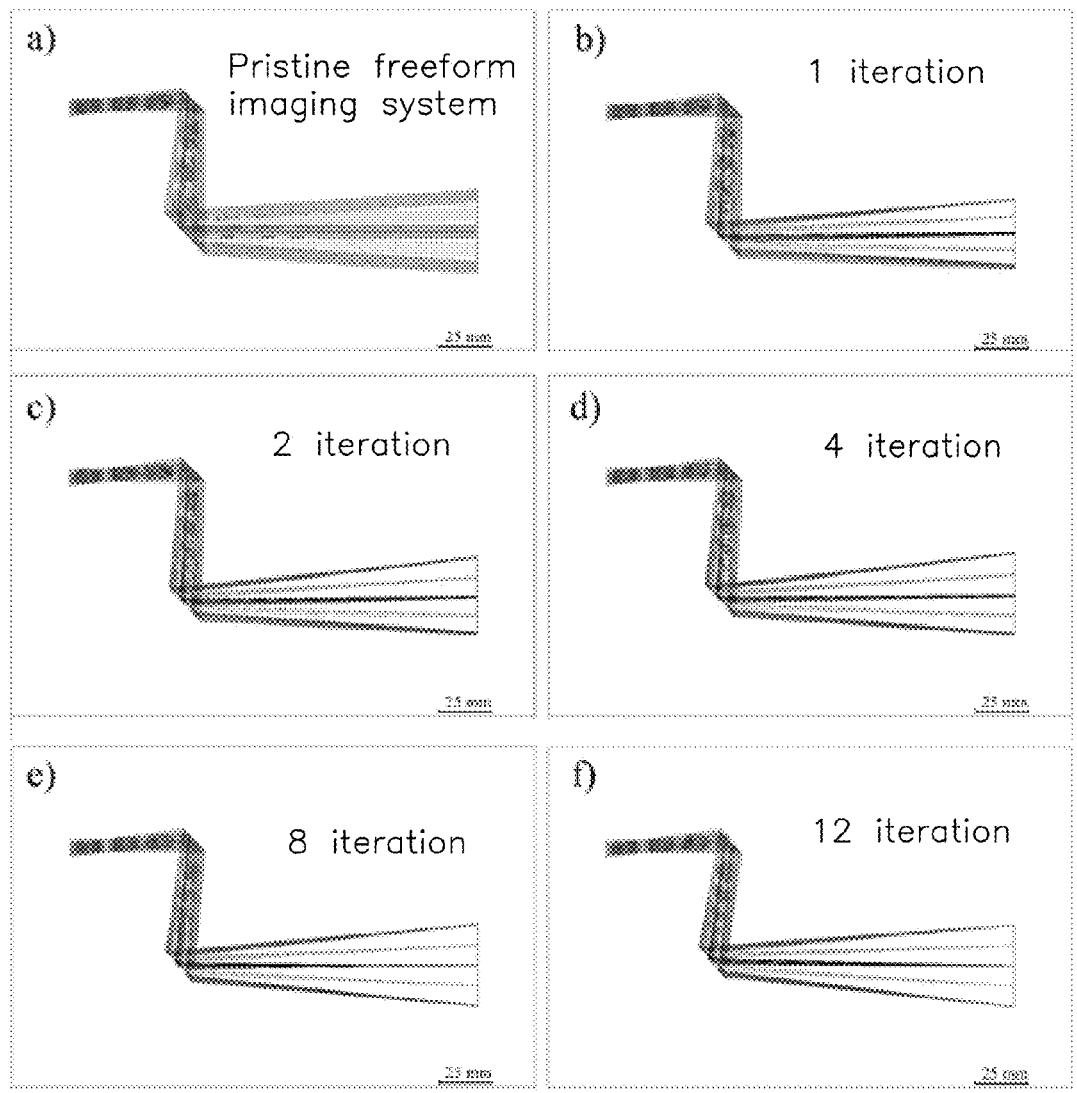
FIG. 9 shows a schematic view of one embodiment of a plurality of results of the freeform imaging system after 1, 2, 4, 8, and 12 iterations.

FIG. 9 shows the effect of the freeform imaging system after 1, 2, 4, 8, and 12 iterations. It can be seen that the image quality improves dramatically with successive iterations. It can be seen that the spot sizes of different fields and the difference between them reduce rapidly in the first few iterations, which means the convergence of the construction-iteration method is very fast. After several iterations, the average spot diameter converges to a steady value around 220 μm. The standard deviation of different sampling field is less than 10 μm, which indicates that the image qualities of different sampling fields are significantly improved simultaneously.

Figure 10:
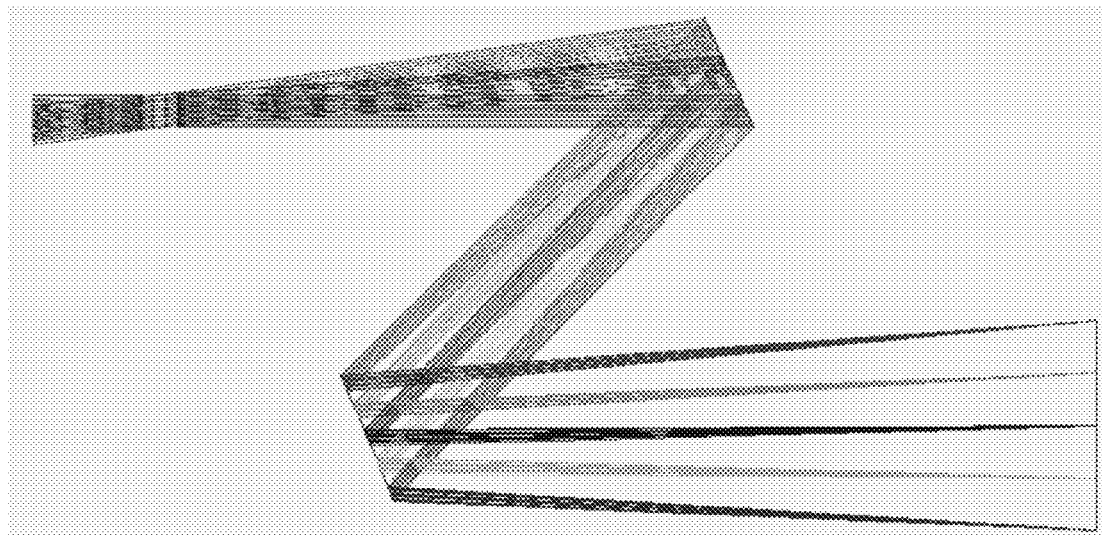
FIG. 10 shows a schematic view of one embodiment of an effect of the freeform imaging system.
Figure 11:
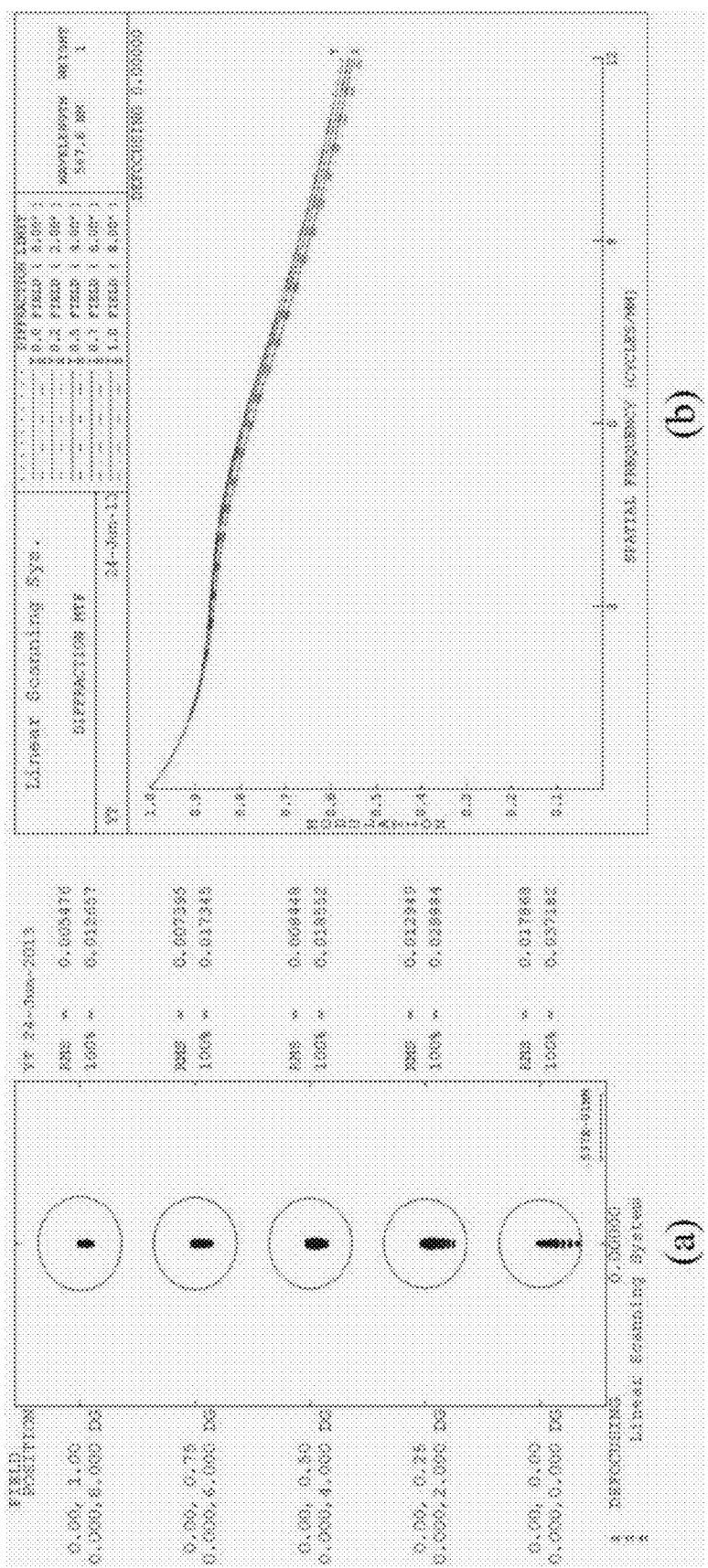
FIG. 11 shows a schematic view of one embodiment of an image quality analysis of the freeform imaging system.

Furthermore, referring to FIG. 10, the freeform imaging system after 12 iterations can also be taken as the starting point for further optimization in optical design software such as CODE V. The final freeform imaging system can be obtained quickly by optimization.

The design method of freeform imaging systems is simpler and can be applied to various structures and system parameters. Given the object-image relationships and an initial system with planes, sphere, or other surface type, each freeform surface can be generated by a construction approach with feature rays of different fields and different pupil coordinates based on the "Nearest-ray Principle". Furthermore, the image quality is improved rapidly with the iterative process.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A design method of freeform imaging system comprising:
    step (S10), establishing a initial freeform imaging system comprising a first initial surface and a second initial surface spaced from each other, wherein a plurality light rays from an object are redirected to form a plurality of image points adjacent to the ideal image points by the first initial surface and the second initial surface;
    step (S20), constructing a second surface by calculating and curve fitting a plurality of second data points through a plurality of feature rays based on a given object-image relationship, wherein the first initial surface is fixed, and the plurality of feature rays are substantially intersecting the image plane at the plurality of ideal image points;
    step (S30), constructing a first surface by calculating and curve fitting a plurality of first data points based on the given object-image relationship and Fermat's principle, wherein the second surface is fixed, and the plurality of feature rays are substantially intersecting the image plane at the plurality of ideal image points; and
    step (S40), substituting the first surface and the second surface for the first initial surface and second initial surface respectively, and repeating step (S20) and step (S30) until the plurality of feature rays are intersecting the image plane at the plurality of ideal image points.

2. The design method of claim 1, wherein the first initial surface is planar, curved, or spherical, and the second initial surface is planar, curved, or spherical.

3. The design method of claim 1, wherein the object is an entrance pupil, and a coordinate system is established in the initial freeform imaging system, the origin of the coordinate system is located at the center of the entrance pupil; a z-axis is defined as the direction of the rays outgoing from the entrance pupil and perpendicular with the image plane; and the x-axis and y-axis are perpendicular with each other and perpendicular with the z-axis, a plurality of one-dimensional sampling fields are defined in YOZ coordinate surface.

4. The design method of claim 3, wherein a field-of-view of the initial freeform imaging system is divided into M sampling fields with equal interval.

5. The design method of claim 4, wherein each of the M sampling fields is divided by N feature rays, and the N feature rays comprise marginal rays of the entrance pupil.

6. The design method of claim 5, wherein a diameter of the entrance pupil is divided into N−1 portions in each of the M sampling fields, and a total of K=M×N feature rays are selected according to different sampling fields.

7. The design method of claim 6, wherein the plurality of feature rays are intersecting the first initial surface at a plurality of start points $S_i$ (i=0, 1, 2 . . . K−1), and intersecting the surface Ω+1 at a plurality of end points $E_i$ (i=0, 1, 2 . . . K−1).

8. The design method of claim 7, wherein the plurality of end points $E_i$ (i=0, 1, 2 . . . K−1) are obtained based on the Fermat's principle.

9. The design method of claim 8, wherein the plurality of end points $E_i$ (i=0, 1, 2 . . . K−1) of the plurality of feature rays are the plurality of ideal image points and calculated based on the given object-image relationship.

10. The design method of claim 9, wherein a unit normal vector $\vec{N}_i$ at each of the plurality of second data point $P_i$ is calculated based on the vector form of Snell's Law, the second surface is a refractive surface, and:

$$\vec{N}_i = \frac{n'\vec{r}_i' - n\vec{r}_i}{|n'\vec{r}_i' - n\vec{r}_i|};$$

where $\vec{r}_i = \frac{\overrightarrow{P_i S_i}}{|\overrightarrow{P_i S_i}|}, \vec{r}_i' = \frac{\overrightarrow{E_i P_i}}{|\overrightarrow{E_i P_i}|}$ are the unit vectors along the directions of the incident and exit ray at two opposite sides of the second surface respectively; n, n' are the refractive indices of the two media at two opposite sides of the second surface.

11. The design method of claim 9, wherein a unit normal vector $\vec{N}_1$ at each of the plurality of second data point $P_i$ is calculated based on the vector form of Snell's Law, the second surface is a reflective surface, and:

$$\vec{N}_i = \frac{\vec{r}_i' - \vec{r}_i}{|\vec{r}_i' - \vec{r}_i|};$$

where $\vec{r}_i = \frac{\overrightarrow{P_i S_i}}{|\overrightarrow{P_i S_i}|}, \vec{r}_i' = \frac{\overrightarrow{E_i P_i}}{|\overrightarrow{E_i P_i}|}$ are the unit vectors along the directions of the incident and exit ray at two opposite sides of the second surface respectively.

12. The design method of claim 9, wherein the calculating the plurality of second data points $P_i$ of the second surface comprises the following substeps:
step (S21), fixing an initial second data point $P_0$, wherein the initial second data point $P_0$ is the intersection between a first feature ray and the second initial surface, and the first feature ray is the marginal feature ray from the margin of the entrance pupil;
step (S22), obtaining a second feature ray from the K−1 feature rays, wherein the second feature ray is intersecting the second initial surface at the second data point $P_1$ adjacent to the initial second data point $P_0$;
step (S23), calculating a surface normal $\vec{N}_1$ at the second data point $P_1$ based on a start point $S_1$ an end point $E_1$ of the second feature ray;
step (S24), obtaining the second data point $P_2$ which is nearest to the second data point $P_1$ among the rest of K−2 intersections of the tangent vector $\vec{T}_1$ at the second data point $P_1$ and the remaining K−2 feature rays; and
step (S25), repeating steps (S22) to steps (S24) until all of the $P_i$ (i=0, 1, 2 . . . K−1) are obtained.

13. The design method of claim 12, wherein a surface normal $\vec{N}_0$ at the initial second data point $P_0$ is calculated by $$\vec{N}_i = \frac{n'\vec{r}_i' - n\vec{r}_i}{|n'\vec{r}_i' - n\vec{r}_i|} \text{ or } \vec{N}_i = \frac{\vec{r}_i' - \vec{r}_i}{|\vec{r}_i' - \vec{r}_i|}, \text{ wherein } \vec{r}_i = \frac{\overrightarrow{P_i S_i}}{|\overrightarrow{P_i S_i}|},$$

$$\vec{r}_i' = \frac{\overrightarrow{E_i P_i}}{|\overrightarrow{E_i P_i}|}$$

are the unit vectors along the directions of the incident and exit ray at two opposite sides of the second surface respectively; n, n' are the refractive indices of the two media at two opposite sides of the second surface.

14. The design method of claim 12, wherein the second data point $P_1$ is obtained by finding the second data point nearest to the second data point $P_0$ among the K−1 intersections $G_{0i}$ (i=1,2 . . . K−1) where the tangent vector $\vec{T}_0$ intersects with the remaining K−1 feature rays from the first surface.

15. The design method of claim 12, wherein an incident ray $\overline{S_i P_i}$ redirected into $\overline{P_i P_i'}$ by the first surface, and $\overline{P_i P_i'}$ is then redirected to its ideal image point $I_i$ by the second surface, and $P_i'$ stands for the end point $E_i$ of the feature ray when calculating the first data points on the first surface.

16. The method of claim 15, wherein the coordinate of $P_i'$ is calculated based on Fermat's principle.

17. The method of claim 16, wherein $P_i'$ is a point on the second surface which minimizes the optical path length between $P_i$-$P_i'$-$I_i$, and an optical path length L of $P_i$-$P_i'$-$I_i$ is expressed as:

$$L = n_{1-2} L_1 + n_{2\text{-}image} L_2 = n_{1-2} \overline{P_i P_i'} + n_{2\text{-}image} \overline{P_i' I_i} \quad (3)$$

wherein $n_{1-2}$ is the refractive indices of the medium between first surface and second surface, and $n_{2\text{-}image}$ is the medium between the second surface and the image plane.

18. The design method of claim 17, wherein a surface normal $\vec{N}_i$ at each first data point is obtained with $S_i$, $P_i$ and $P_i'$, using by $$\vec{N}_i = \frac{n'\vec{r}_i' - n\vec{r}_i}{|n'\vec{r}_i' - n\vec{r}_i|} \text{ or } \vec{N}_i = \frac{\vec{r}_i' - \vec{r}_i}{|\vec{r}_i' - \vec{r}_i|}, \text{ wherein } \vec{r}_i = \frac{\overrightarrow{P_i S_i}}{|\overrightarrow{P_i S_i}|},$$

$$\vec{r}_i' = \frac{\overrightarrow{E_i P_i}}{|\overrightarrow{E_i P_i}|}$$

are the unit vectors along the directions of the incident and exit ray at two opposite sides of the second surface respectively; n, n' are the refractive indices of the two media at two opposite sides of the second surface.

19. The design method of claim 18, wherein the plurality of first data points are a plurality of intersections between the plurality of feature rays and the first surface, and calculated based on the surface normal $\vec{N}_i$.

20. A design method of freeform imaging system comprising:
- establishing a initial freeform imaging system comprising a first initial surface and a second initial surface spaced from each other, wherein a plurality light rays from an object are redirected by the first initial surface and the second initial surface, and form a plurality of image points adjacent to the ideal image points;
- constructing the second surface by calculating and curve fitting a plurality of second data points through a plurality of feature rays based on a given object-image relationship, wherein the first initial surface is fixed, and the plurality of feature rays are substantially intersecting the image plane at the plurality of ideal image points; and
- constructing the first surface by calculating and curve fitting a plurality of first data points based on the given object-image relationship and Fermat's principle, wherein the second surface is fixed, and the plurality of feature rays are intersecting the image plane at the plurality of ideal image points.

* * * * *